United States Patent
Bewlay et al.

(10) Patent No.: US 8,062,581 B2
(45) Date of Patent: Nov. 22, 2011

(54) REFRACTORY CRUCIBLES CAPABLE OF MANAGING THERMAL STRESS AND SUITABLE FOR MELTING HIGHLY REACTIVE ALLOYS

(76) Inventors: Bernard Patrick Bewlay, Niskayuna, NY (US); Michael Francis Xavier Gigliotti, Scotia, NY (US); Mohamed Rahmane, Clifton Park, NY (US); Thomas Joseph Kelly, Cincinnati, OH (US); Michael James Weimer, Loveland, OH (US); Sairam Sundaram, Guilderland, NY (US)

( * ) Notice: Subject to any disclaimer, the term of this patent is extended or adjusted under 35 U.S.C. 154(b) by 537 days.

(21) Appl. No.: 11/947,909

(22) Filed: Nov. 30, 2007

(65) Prior Publication Data
US 2009/0140473 A1   Jun. 4, 2009

(51) Int. Cl.
*B22D 45/00* (2006.01)

(52) U.S. Cl. .......................... 266/275; 266/286; 432/262

(58) Field of Classification Search .................. 266/275, 266/280, 286; 432/262
See application file for complete search history.

(56) References Cited

U.S. PATENT DOCUMENTS

| | | | |
|---|---|---|---|
| 1,572,475 A * | 2/1926 | Frary | 432/264 |
| 4,703,806 A | 11/1987 | Lassow et al. | |
| 4,740,246 A | 4/1988 | Feagin | |
| 4,787,439 A | 11/1988 | Feagin | |
| 4,911,895 A * | 3/1990 | Kida et al. | 117/208 |
| 4,966,225 A | 10/1990 | Johnson et al. | |
| 4,996,175 A | 2/1991 | Sturgis | |
| 5,299,619 A | 4/1994 | Chandley et al. | |
| 5,407,001 A | 4/1995 | Yasrebi et al. | |
| 5,464,797 A | 11/1995 | Yasrebi et al. | |
| 6,024,163 A | 2/2000 | Springgate et al. | |

* cited by examiner

*Primary Examiner* — Scott Kastler
(74) *Attorney, Agent, or Firm* — General Electric Company; Marcella R. Louke (57) ABSTRACT

Refractory crucibles capable of managing thermal stress and suitable for melting highly reactive alloys having a facecoat, a backing, and at least one retaining ring applied about at least a portion of the backing of the crucible, the retaining ring comprising a composition selected from the group consisting of conductive materials, non-conductive materials, and combinations thereof.

17 Claims, 6 Drawing Sheets

REFRACTORY CRUCIBLES CAPABLE OF MANAGING THERMAL STRESS AND SUITABLE FOR MELTING HIGHLY REACTIVE ALLOYS

TECHNICAL FIELD

Embodiments described herein generally relate to crucibles capable of managing thermal stress. More particularly, embodiments herein generally describe refractory crucibles having at least one retaining ring for managing thermal stress, the crucible being suitable for melting highly reactive titanium alloys, such as titanium aluminide.

BACKGROUND OF THE INVENTION

Turbine engine designers are continuously looking for new materials with improved properties for reducing engine weight and obtaining higher engine operating temperatures. Titanium alloys, and in particular, titanium aluminide (TiAl) based alloys, possess a promising combination of low-temperature mechanical properties, such as room temperature ductility and toughness, as well as high intermediate temperature strength and creep resistance. For these reasons, TiAl-based alloys have the potential to replace nickel-based superalloys, which are currently used to make numerous turbine engine components.

Vacuum induction melting is one method often used to make turbine engine components, such as airfoils, and generally involves heating a metal in a crucible made from a non-conductive refractory alloy oxide until the charge of metal within the crucible is melted down to liquid form. When melting highly reactive metals such as titanium or titanium alloys, vacuum induction melting using cold wall or graphite crucibles is typically employed. This is because melting and casting from ceramic crucibles can introduce significant thermal stress on the crucible, which can result in the crucible cracking. Such cracking can reduce crucible life and cause inclusions in the component being cast.

Moreover, difficulties can arise when melting highly reactive alloys, such as TiAl, due to the reactivity of the elements in the alloy at the temperatures needed for melting to occur. As previously mentioned, while most vacuum induction melting systems use refractory alloy oxides for crucibles in the induction furnace, alloys such as TiAl are so highly reactive that they can attack the refractory alloys present in the crucible and contaminate the titanium alloy. For example, ceramic crucibles are typically avoided because the highly reactive TiAl alloys can break down the crucible and contaminate the titanium alloy with both oxygen and the refractory alloy from the oxide. Similarly, if graphite crucibles are employed, the titanium aluminide can dissolve large quantities of carbon from the crucible into the titanium alloy, thereby resulting in contamination. Such contamination results in the loss of mechanical properties of the titanium alloy.

Additionally, while cold crucible melting can offer metallurgical advantages for the processing of the highly reactive alloys described previously, it also has a number of technical and economic limitations including low superheat, yield losses due to skull formation and high power requirements. Furthermore, undesirable thermal stresses may build up in the crucible during the melting and casting process, which can damage the crucible, resulting in cracking. More specifically, different regions of the crucible can experience different thermal stresses during the melting and casting process.

For example, the outside of the crucible typically heats up faster than the inside of the crucible due to induction coupling, and also cools down faster than the inside of the crucible after pouring. This temperature difference can shift the point region of maximum stress from the inside of the crucible, into the crucible wall, and drive cracks therethrough. As another example, during melting, there is typically not much thermal stress about the top the crucible as there is generally no molten material in this region. However, during pouring, the molten metal will contact the top of the crucible, thereby increasing the thermal stresses present in this region of the crucible. As previously described, such thermal stresses, and changes on thermal stresses, can result in crucible cracking, which can shorten crucible life and negatively impact crucible performance.

Accordingly, there remains a need for refractory crucibles capable of managing the thermal stress generated during the casting of highly reactive titanium alloys.

BRIEF DESCRIPTION OF THE INVENTION

Embodiments herein generally relate to refractory crucibles capable of managing thermal stress and suitable for melting highly reactive alloys comprising a facecoat, a backing, and at least one retaining ring applied about at least a portion of the backing of the crucible, the retaining ring comprising a composition selected from the group consisting of conductive materials, non-conductive materials, and combinations thereof.

Embodiments herein also generally relate to refractory crucibles capable of managing thermal stress and suitable for melting highly reactive alloys comprising a facecoat, a backing, and a plurality of retaining rings applied about the backing of the crucible, each retaining ring has a geometry including a thickness of from about 1 mm to about 50 mm and a width of from about 1 mm to about 200 mm.

Embodiments herein also generally relate to refractory crucible capable of managing thermal stress and suitable for melting highly reactive alloys comprising any of a base region, a transition region, a lower region, an upper region, and a pour lip region, and a plurality of retaining rings applied about at least two regions of the crucible to manage particular thermal stresses present in the different regions of the crucible.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to refractory crucibles capable of managing the thermal stress generated during the casting of highly reactive titanium alloys. More specifically, embodiments described herein generally relate to refractory crucible capable of managing thermal stress and suitable for melting highly reactive alloys comprising a facecoat, a backing, and at least one retaining ring applied about at least a portion of the backing of the crucible, the retaining ring comprising a composition selected from the group consisting of conductive materials, non-conductive materials, and combinations thereof.

While embodiments herein will generally focus on crucibles suitable for melting TiAl for use in making near net shape airfoils, the description should not be limited to such. Those skilled in the art will understand that the present embodiments may be suitable for melting any titanium alloy for use in making any near net shape gas turbine component in which thermal stress is an issue.

Figure 1:
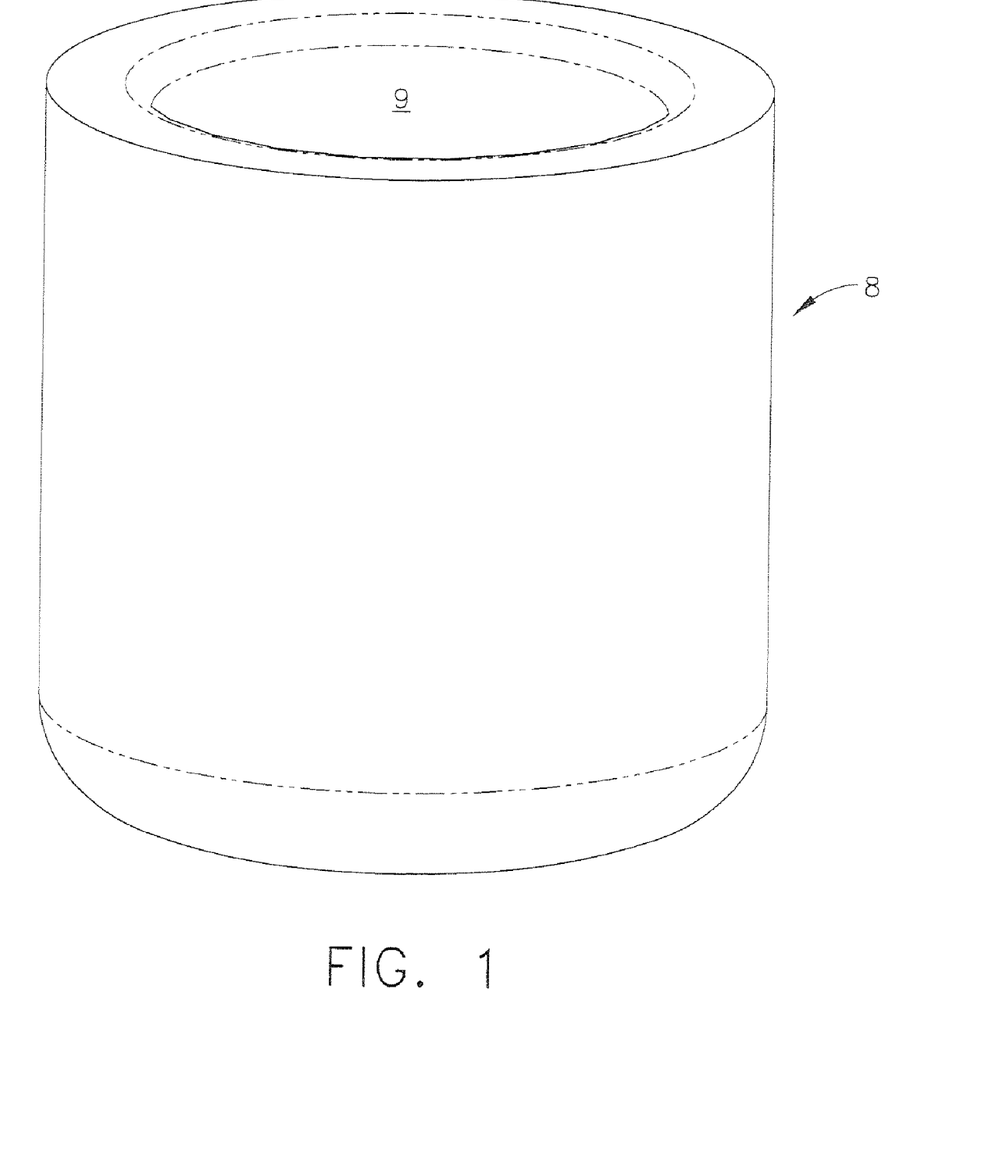
FIG. 1 is a schematic perspective view of one embodiment of a crucible in accordance with the description herein.
Figure 2:
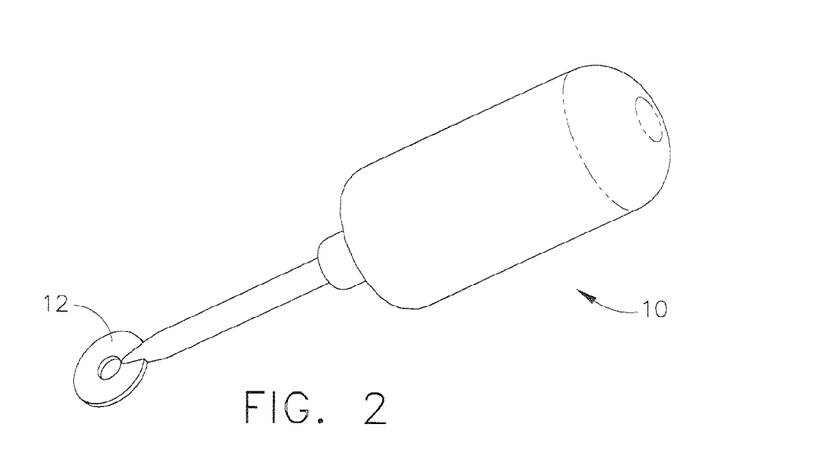
FIG. 2 is a schematic perspective view of one embodiment of a form in accordance with the description herein.

Turning to FIG. 1, embodiments herein relate to a refractory crucible 8 suitable for melting highly reactive alloys, and in particular, titanium alloys. Crucible 8 can have an interior 9 and can be made in accordance with the description herein below. To begin, a crucible mold can be made. As used herein "mold" refers to the unfired components that when fired under suitable conditions form crucible 8 of FIG. 1. To make a crucible mold, a form 10 can be provided, as shown in FIG. 2. While form 10 can comprise any material capable of removal from the crucible mold, in one embodiment, form 10 can comprise wax, plastic or wood, and may be hollow or solid. Moreover, form 10 can take any shape and have any dimension necessary to produce the desired interior of the crucible and may comprise a handle 12, or other like mechanism, for ease of handling.

Figure 3:
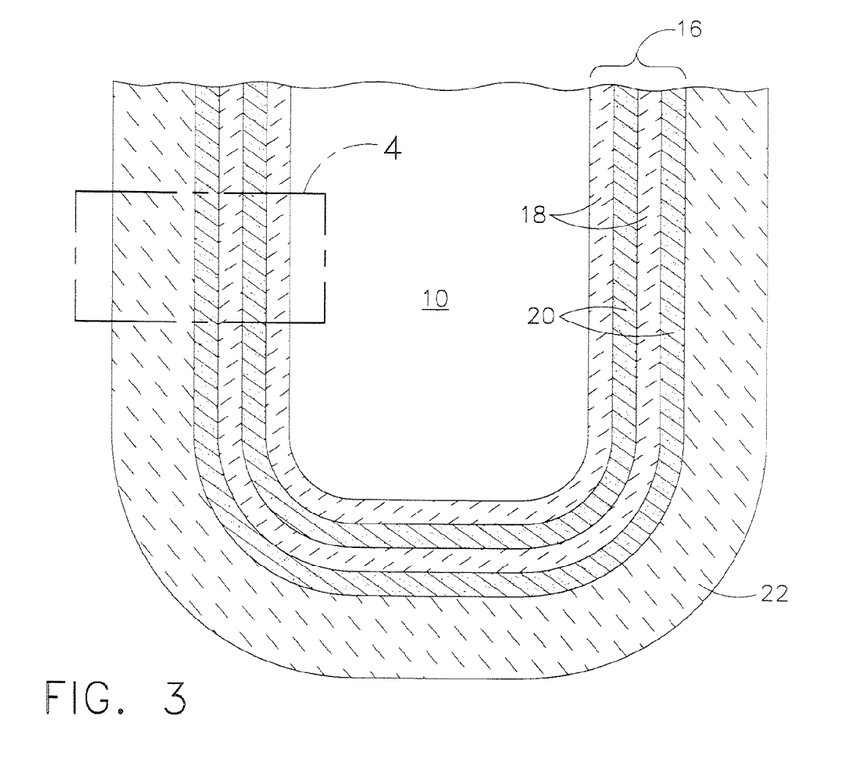
FIG. 3 is a schematic cross-sectional view of one embodiment of a crucible mold in accordance with the description herein.
Figure 4:
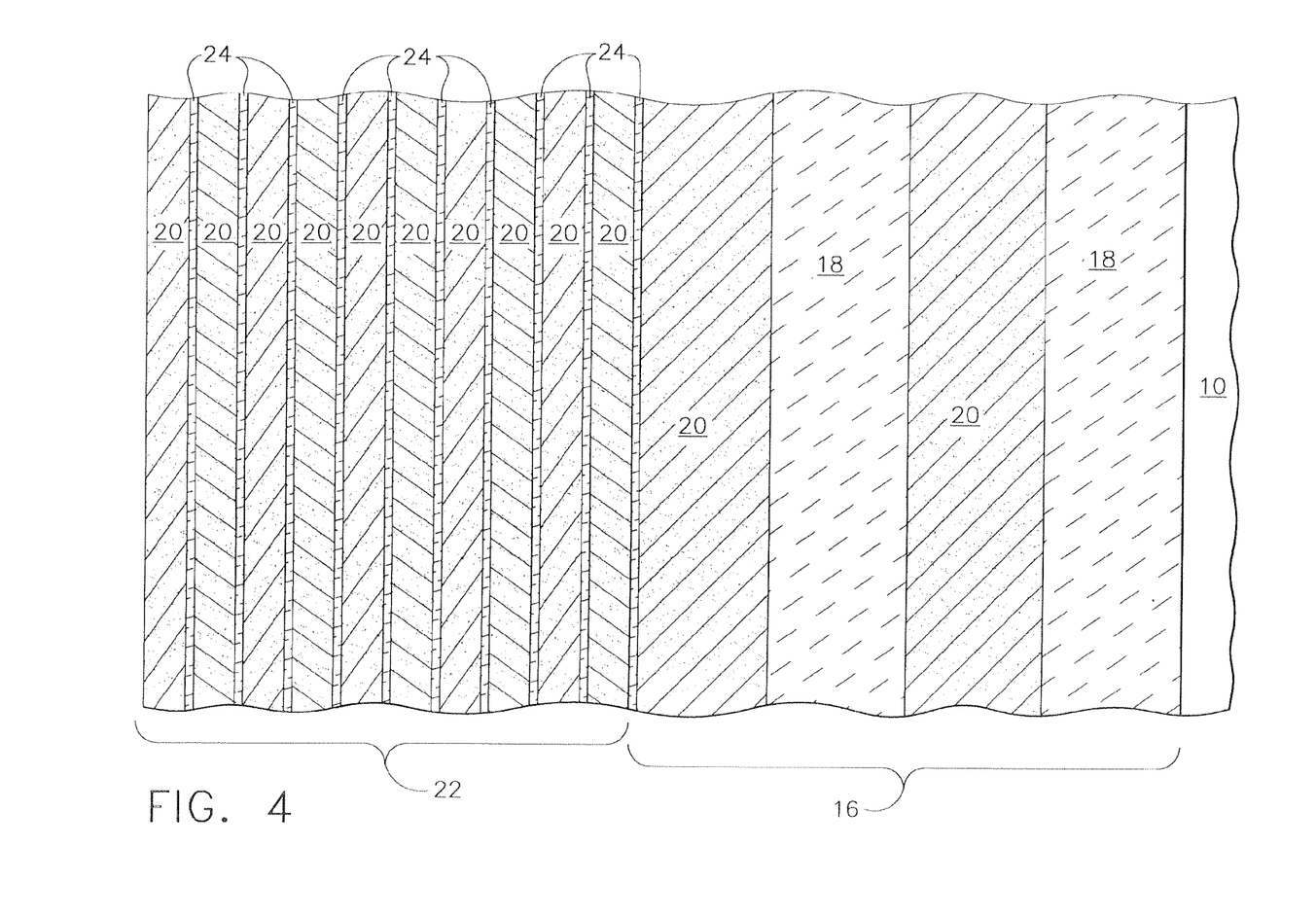
FIG. 4 is a schematic close-up view of a portion of the cross-section of the embodiment of the crucible mold of FIG. 3.

As shown in FIGS. 3 and 4, a facecoat 16 comprising at least one facecoat layer 18, and optionally at least one stucco layer 20, can be applied to form 10. As used herein throughout, "at least one" means that there may be one or more than one and specific layers will be designated herein throughout as "first facecoat layer," "second facecoat layer," and the like. Since facecoat layer 18 can be exposed to the TiAl during the melting process, facecoat layer 18 should be inert to the reactive TiAl so as not to degrade and contaminate the alloy during melting. Therefore, in one embodiment, face coat layer 18 may comprise an oxide. As used herein throughout, "oxide" refers to a composition selected from the group consisting of scandium oxide, yttrium oxide, hafnium oxide, a lanthanide series oxide, and combinations thereof. Furthermore, the lanthanide series oxide (also known as "rare earth" compositions) may comprise an oxide selected from the group consisting of lanthanum oxide, cerium oxide, praseodymium oxide, neodymium oxide, promethium oxide, samarium oxide, europium oxide, gadolinium oxide, terbium oxide, dysprosium oxide holmium oxide, erbium oxide, ytterbium oxide, lutetium oxide, and combinations thereof.

Facecoat layer 18 may comprise a facecoat slurry made from a powder of the oxide mixed into a colloidal suspension. In one embodiment, the oxide powder may be a small particle powder having a size of less than about 70 microns, and in another embodiment, from about 0.001 microns to about 50 microns, and in yet another embodiment from about 1 micron to about 50 microns. The colloid can be any colloid that gels in a controlled fashion and is inert to TiAl, such as, for example, colloidal silica, colloidal yttria, colloidal alumina, colloidal calcium oxide, colloidal magnesium oxide, colloidal zirconium dioxide, colloidal lanthanide series oxides, and mixtures thereof. While any of the previously listed oxides can be used to make the facecoat slurry of facecoat layer 18, in one embodiment, the facecoat slurry may comprise yttrium oxide particles in a colloidal silica suspension, while in another embodiment, the facecoat slurry may comprise yttrium oxide particles in a colloidal yttria suspension. The composition of the facecoat slurry can vary, however, in general, the facecoat slurry may comprise from about 40% to about 100% of the oxide and from about 0% to about 60% of the colloid, by weight.

Once the facecoat slurry of facecoat layer 18 is prepared using conventional practices, form 10 may be exposed to the facecoat slurry using a method selected from the group consisting of dipping, spraying, and combinations thereof. Generally, once applied, facecoat layer 18 can have a thickness of from about 50 microns to about 500 microns, and in one embodiment from about 150 microns to about 300 microns, and in yet another embodiment about 200 microns.

While still wet, facecoat layer 18 may optionally be coated with a stucco layer 20, as shown in FIGS. 3 and 4. As used herein, "stucco" refers to coarse ceramic particles generally having a size greater than about 100 microns, and in one embodiment from about 100 microns to about 5000 microns. Stucco 20 can be applied to each facecoat layer to help build up the thickness of the crucible wall and provide additional strength. A variety of materials may be suitable for use as stucco layer 20, however, in one embodiment, the stucco may comprise a refractory material, such as, but not limited to, alumina or aluminosilicates, combined with an oxide, as defined herein. The ratio of the refractory material to the oxide in stucco layer 20 can vary, however, in one embodiment, stucco layer 20 can comprise from about 0% to about 60% of the refractory material and from about 40% to about 100% of the oxide, by weight. Stucco layer 20 may be applied to facecoat layer 18 in any acceptable manner, such as dusting for example. Generally, stucco layer 20 can have a thickness of from about 100 microns to about 2000 microns, and in one embodiment from about 150 microns to about 300 microns, and in yet another embodiment about 200 microns.

Facecoat layer 18, and optional stucco layer 20 can be air-dried and additional facecoat layers and stucco layers may be applied in the manner described previously, if desired, to complete facecoat 16. In the embodiments shown in FIGS. 3 and 4, first and second facecoat layers 18, and alternating stucco layers 20, are present, though those skilled in the art will understand that facecoat 16 may comprise any number of facecoat layers and stucco layers. While each facecoat layer 18 may comprise a different oxide/colloid mixture, in one embodiment, each facecoat layer 18 comprises the same oxide/colloid mixture. Once the desired number of facecoat layers 18 and stucco layers 20 have been applied, a backing 22 may then be applied.

Backing 22 can help provide additional strength and durability to the finished crucible 8. As such, backing 22 may consist of at least one backing layer 24, shown in FIG. 4, which can comprise a backing slurry including a refractory material selected from the group consisting of aluminum oxide, zirconium silicate, silicon dioxide, and combinations thereof, in a colloidal silica suspension. Specific layers may be designated herein throughout as "first backing layer," "second backing layer," and the like. As an example, in one embodiment, backing layer 24 may comprise a backing slurry made from aluminum oxide particles in a colloidal silica suspension. The composition of the backing slurry can vary, however, in general, the backing slurry may comprise from about 10% to about 40% of the refractory material and from about 60% to about 90% of the colloid, both by weight. Similar to the facecoat layers, each backing layer 24 may optionally comprise a stucco layer 20 adhered thereto, as shown in FIG. 4, which may be the same as or different from the stucco used previously to make the facecoat. Each backing layer 24, including the stucco, can have a thickness of from about 150 microns to about 4000 microns, and in one embodiment from about 150 microns to about 1500 microns, and in yet another embodiment about 700 microns.

Similar to the facecoat layers, each backing layer 24 may be applied using a method selected from the group consisting of dipping, spraying, and combinations thereof. While any number of backing layers 24 can be applied, in one embodiment, there may be from 2 to 40 backing layers. Each backing layer 24 may comprise the same composition of refractory material and colloid, each may be different, or they may comprise some combination in between. After applying the desired number of backing layers, and optional stucco layers, the resulting crucible mold 26 can be further processed.

It should be noted that in some cases it may be desirable to grade the stucco layers by altering particle size, layer thickness and/or composition as they are applied. As used herein, the term "grade," and all forms thereof, refers to gradually increasing the strength of subsequently applied stucco layers by, for example, increasing the particle size of the stucco material, increasing the thickness of the stucco layer and/or utilizing increasingly stronger refractory material/colloid compositions as the stucco layer. Such grading can allow the stucco layers to be tailored to account for differences in thermal expansion and chemical properties of the various facecoat layers and backing layers to which they are applied. More specifically, grading the stucco layers provides differing porosities and can adjust the modulus of the crucible, which taken together, can help account for the differences in thermal expansion as previously discussed.

Figure 5:
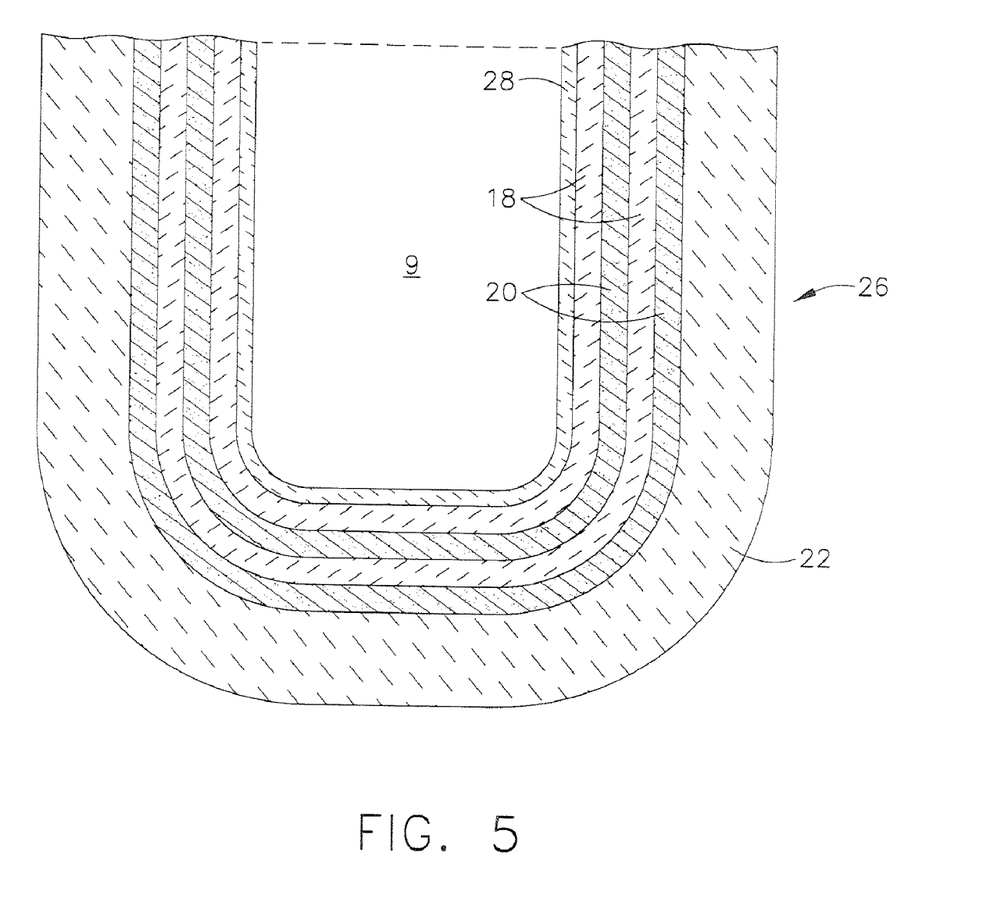
FIG. 5 is a schematic cross-sectional view of one embodiment of a crucible mold after the form has been removed and a topcoat applied in accordance with the description herein.

Crucible mold 26 may then be dried using conventional practices and form 10 may be removed. A variety of methods may be used to remove form 10 from crucible mold 26. As previously mentioned, form 10 may comprise wax and therefore may be removed by placing crucible mold 26 in a furnace, steam autoclave, microwave, or other like device, and melting form 10 leaving an open interior 9 in crucible mold 26, as shown in FIG. 5. The temperature required to melt form 10 from crucible mold 26 can generally be low and in one embodiment, can range from about 40° C. to about 120° C.

Optionally, interior 9 of crucible mold 26 may then be washed with a colloidal slurry to form a topcoat 28, as shown in FIG. 5. Washing can generally involve applying a coating to the interior of the crucible using any method known to those skilled in the art, such as spraying, prior to firing the crucible. Topcoat 28 can have any desired thickness, however, in one embodiment, topcoat 28 has a thickness of up to about 500 microns, and in another embodiment from about 20 microns to about 400 microns. Topcoat 28 can comprise a colloidal slurry selected from the group consisting of yttria in a colloidal yttria suspension, yttria in a colloidal silica suspension, and combinations thereof. This topcoat can help further ensure that the crucible will remain inert with respect to the titanium alloy during melting.

The hollow crucible mold 26 can then be fired to higher temperatures. Firing crucible mold 26 can help provide additional strength to the finished crucible because during this heating process, the materials that make up the facecoat layers, stucco, and backing layers can interdiffuse with one another and sinter together. Initially, the crucible mold can be fired to a temperature of from about 800° C. to about 1400° C., and in one embodiment from about 900° C. to about 1100° C., and in one embodiment about 1000° C. This first firing can take place for any length of time needed to help burn off any remaining form material, as well as provide a limited degree of interdiffusion among the ceramic constituents of the crucible, which in one embodiment may be from about 0.5 hours to about 50 hours, in another embodiment from about 1 hour to about 30 hours, and in yet another embodiment about 2 hours. Next, the crucible mold can be fired to a temperature of from about 1400° C. to about 1800° C., and in one embodiment from about 1500° C. to about 1800° C., and in yet another embodiment from about 1600° C. to about 1700° C. This second firing can take place for any length of time needed to substantially complete the interdiffusion of the ceramic constituents, as well as cause a reaction of the colloid present in the facecoat oxide, which in one embodiment may be from about 0.5 hours to about 50 hours, in another embodiment from about 1 hour to about 30 hours, and in yet another embodiment about 2 hours. For example, colloidal silica can form silicates, while colloidal yttria can sinter with yttria particles present in the slurry of the facecoat.

While specific characteristics of crucible 8 can be altered or modified depending on the desired use, in one embodiment, crucible 8 can have an overall wall thickness, that includes all facecoat layers, stucco layers and backing layers, of at least about 3 mm, and in another embodiment at least about 6 mm, and in yet another embodiment from about 6.5 mm to about 40 mm. Wall thicknesses of greater than about 40 mm can lead to undesirably long high heating times. Similarly, the thickness ratio of the backing to the facecoat can, in one embodiment, be from about 6.5:1 to about 20:1. As above, thickness ratios greater than about 20:1 can result in undesirably long high heating times due to the thickness of the alumina backing layers.

Figure 6:
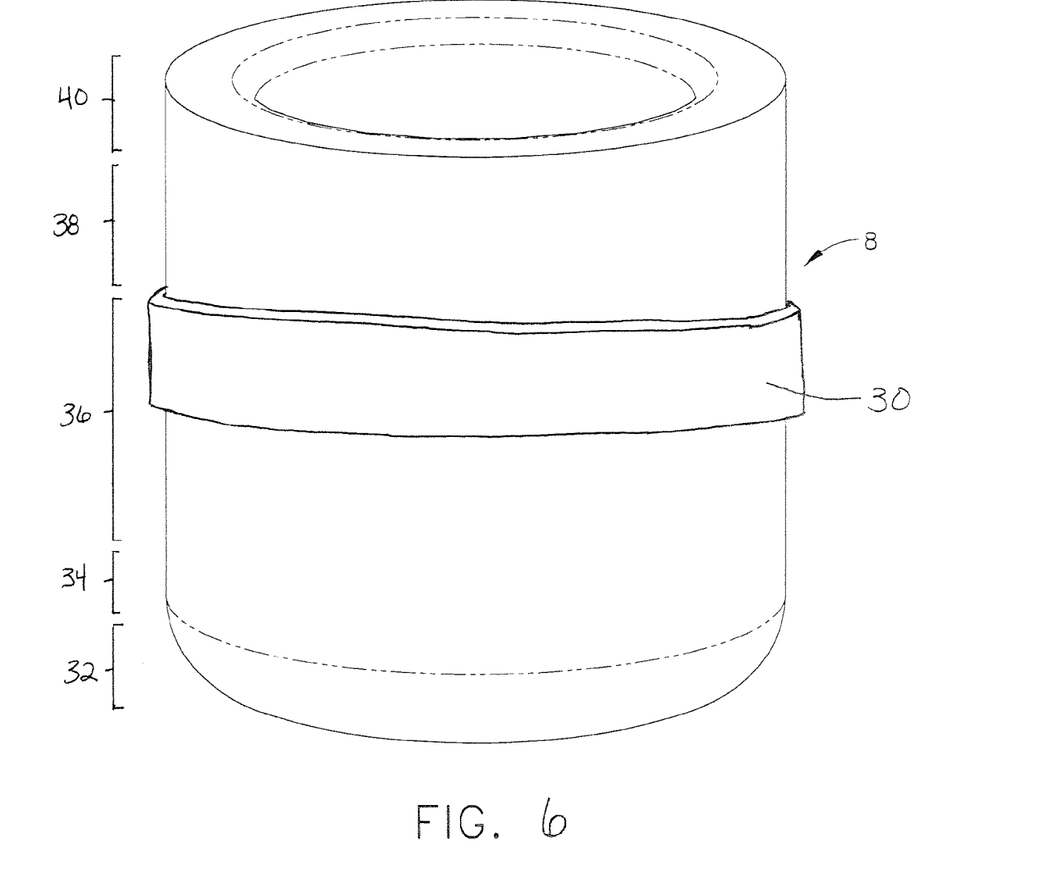
FIG. 6 is a schematic perspective view of one embodiment of a crucible having a retaining ring in accordance with the description herein.
Figure 7:
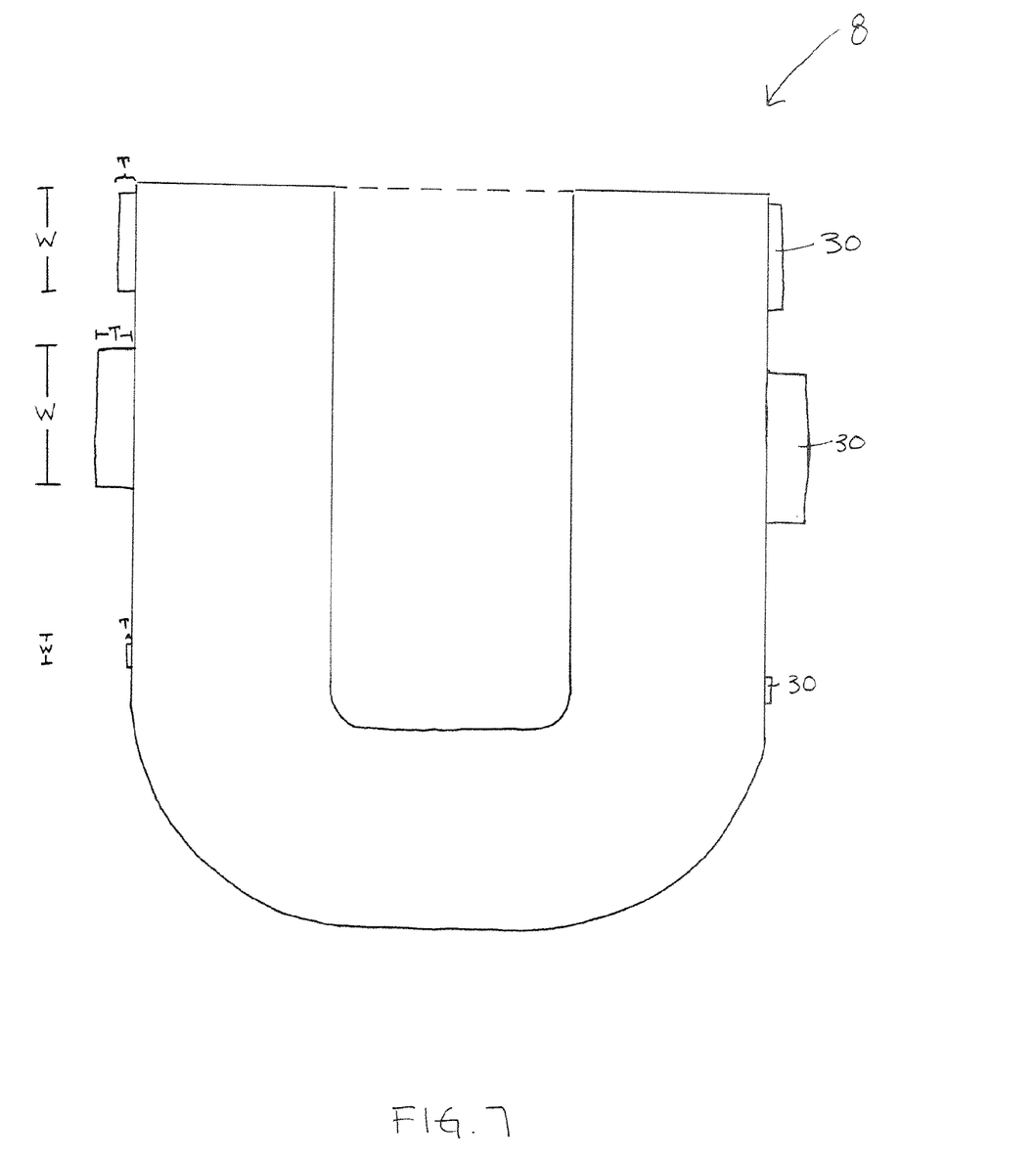
FIG. 7 is a schematic cross-sectional view of one embodiment of a crucible having more than one retaining ring, each ring having a different geometry, in accordance with the description herein.

Crucible 8 can then be fitted with at least one retaining ring 30, and in one embodiment, a plurality of retaining rings, as shown in FIGS. 6 and 7 respectively. Ring 30 can impose compressive stress to a region or regions of crucible 8 that can help crucible 8 withstand thermal stresses throughout the heating, melting, pouring and cooling stages of the casting process. The number, position, composition, and geometry of ring(s) 30 can be tailored to manage particular thermal stresses present in different regions of the crucible, such as the base region 32, the transition region 34 (i.e. the portion connecting base region 32 to lower region 36), the lower region 36 (i.e. the sides containing the titanium melt during casting), the upper region 38 (i.e. the sides above the titanium melt during casting), and the pour lip region 40.

More specifically, in some instances, it may be beneficial to employ more than one ring 30, as shown in FIG. 7, to account for stresses present in different regions of the crucible. For example, hoop stresses in upper region 38 may benefit from the presence of ring 30. If more than one ring 30 is used, those skilled in the art will understand that each ring 30 may have a different composition, position and geometry, as explained herein below.

Moreover, the composition of ring 30 can include a variety of conducting materials, non-conducting materials, and combinations thereof, which can be selected based on the desired properties. In one embodiment, ring 30 may comprise a refractory composition selected from the group consisting of graphite, silicon carbide, a ceramic oxide, a nitride (e.g. hafnium nitride and titanium nitride), and combinations thereof, as such compositions possess the correct coefficient of thermal expansion needed for ring 30 to function as intended.

Additionally, ring 30 may have varying geometry, as shown in FIG. 7, which can be tailored to provide a desired degree of compressive stress. As used herein, "geometry" refers to the thickness and width of retaining ring 30. In general, as the thickness and width of ring 30 increase, the degree of compressive stress imposed by ring 30 also increases. While ring 30 may comprise any thickness T and width W desired, in one embodiment, ring 30 can have a thickness T of from about 1 mm to about 50 mm, and in one embodiment from about 1 mm to about 20 mm, and in still another embodiment from about 5 mm to about 20 mm, and a width W of from about 1 mm to about 200 mm, and in one embodiment from about 1 mm to about 100 mm, in still another embodiment from about 2 mm to about 50 mm, and in yet another embodiment from about 3 mm to about 15 mm. By specifically tailoring the number, position, composition and geometry of ring(s) 30 to the particular regions of the crucible, thermal stress resistance can be optimized to help ensure the crucible maintains its integrity throughout the heating, melting, pouring, and cool-down phases.

Regardless of the number, position, composition or geometry of retaining ring 30, the application thereof generally follows the same procedure. Ring 30 can be heated to expand the internal diameter and allow ring 30 to fit about the crucible in the desired region. While the exact temperature to which ring 30 is heated can vary depending on the composition and geometry, in general, the ring may be heated to a temperature of from about 23° C. (73° F.) to about 1400° C. (2550° F.), and in one embodiment from about 100° C. (212° F.) to about 1400° C. Heating may be accomplished using any suitable method or device known to those skilled in the art such as, but not limited to, a furnace, a gas burner, an induction system, and the like. Once heated, the ring may be applied about the desired region of the crucible. As the heated ring cools to room temperature, it shrink-fits about the crucible, thereby imposing a state of compressive stress about the selected region of the crucible. If more than one ring is used, the same procedure can be used to apply each ring to crucible. Moreover, if more than one retaining rings is used, those skilled in the art will understand that all of the retaining rings may be the same (i.e. have the same composition and geometry, each retaining ring may be different (i.e. each retaining ring may have a different composition and geometry), or a combination thereof (i.e. the retaining rings may have the same composition but a different geometry, or the same geometry but a different composition).

With the ring or rings in place, the crucible may be used to melt titanium alloys, and in particular, TiAl, using conventional melting and casting techniques known to those skilled in the art. The crucibles described herein can be heated rapidly without cracking during any of the heating, melting, pouring, and cooling stages of the casting process.

This improved crucible performance can be attributed to the application of the resistance rings or rings about the crucible. As previously, described, the rings impose a state of residual compressive stress on the crucible that can reduce the build up of thermal stresses that could otherwise result in the crucible cracking. As a result, crucible performance, as well as crucible life, can improve. Moreover, because there can be fewer cracks in the crucible, there is a reduced likelihood of contamination of the TiAl during the melting process when compared to TiAl melted in conventional graphite or ceramic crucibles. Reduced contamination of the alloy can result in components made from the alloy exhibiting less cracking and fewer imperfections than those made from TiAl using current methods.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A refractory crucible capable of managing thermal stress and suitable for melting highly reactive alloys comprising:
    a facecoat including at least one facecoat layer comprising an oxide selected from the group consisting of scandium oxide, yttrium oxide, hafnium oxide, a lanthanide series oxide, and combinations thereof;
    a backing; and
    at least one retaining ring applied about at least a portion of the backing of the crucible, the retaining ring comprising a composition selected from the group consisting of conductive materials, non-conductive materials, and combinations thereof.

2. The crucible of claim 1 wherein the retaining ring comprises a composition selected from the group consisting of graphite, silicon carbide, a ceramic oxide, a nitride, and combinations thereof.

3. The crucible of claim 1 wherein the retaining ring comprises a geometry including a thickness of from about 1 mm to about 50 mm.

4. The crucible of claim 3 wherein the geometry further includes a width of from about 1 mm to about 200 mm.

5. The crucible of claim 4 wherein a plurality of retaining rings are applied about the crucible.

6. The crucible of claim 5 wherein the retaining rings are applied to manage particular thermal stresses present in different regions of the crucible.

7. The crucible of claim 6 wherein all of the retaining rings comprise the same composition and geometry.

8. A refractory crucible capable of managing thermal stress and suitable for melting highly reactive alloys comprising:
    a facecoat including at least one facecoat layer comprising an oxide selected from the group consisting of scandium oxide, yttrium oxide, hafnium oxide, a lanthanide series oxide, and combinations thereof;
    a backing; and
    a plurality of retaining rings applied about the backing of the crucible, each retaining ring has a geometry including a thickness of from about 1 mm to about 50 mm and a width of from about 1 mm to about 200 mm.

9. The crucible of claim 8 wherein each retaining ring comprises a composition selected from the group consisting of conductive materials, non-conductive materials, and combinations thereof.

10. The crucible of claim 9 wherein each retaining ring comprises a composition selected from the group consisting of graphite, silicon carbide, a ceramic oxide, a nitride, and combinations thereof.

11. The crucible of claim 10 wherein each retaining ring comprises the same composition and geometry.

12. The crucible of claim 8 wherein the retaining rings are applied to manage particular thermal stresses present in different regions of the crucible.

13. A refractory crucible capable of managing thermal stress and suitable for melting highly reactive alloys comprising:

a facecoat including at least one facecoat layer comprising an oxide selected from the group consisting of scandium oxide, yttrium oxide, hafnium oxide, a lanthanide series oxide, and combinations thereof;

a backing;

any of a base region, a transition region, a lower region, an upper region, and a pour lip region; and a plurality of retaining rings applied about at least two regions of the crucible to manage particular thermal stresses present in the different regions of the crucible.

14. The crucible of claim 13 wherein each retaining ring comprises a composition selected from the group consisting of graphite, silicon carbide, a ceramic oxide, a nitride, and combinations thereof.

15. The crucible of claim 14 wherein the retaining ring comprises a geometry including a thickness of from about 1 mm to about 50 mm.

16. The crucible of claim 15 wherein the geometry further includes a width of from about 1 mm to about 200 mm.

17. The crucible of claim 16 wherein all of the retaining rings comprise the same composition and geometry.

* * * * *